Feb. 2, 1926.
G. H. FLETCHER
ARMATURE OF DYNAMO ELECTRIC MACHINES
Original Filed Sept. 2, 1922
1,571,914
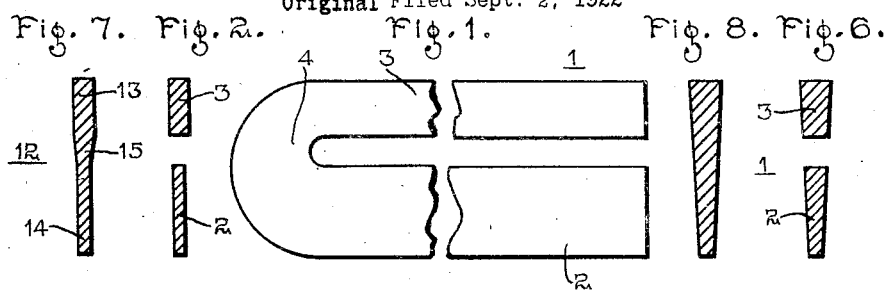
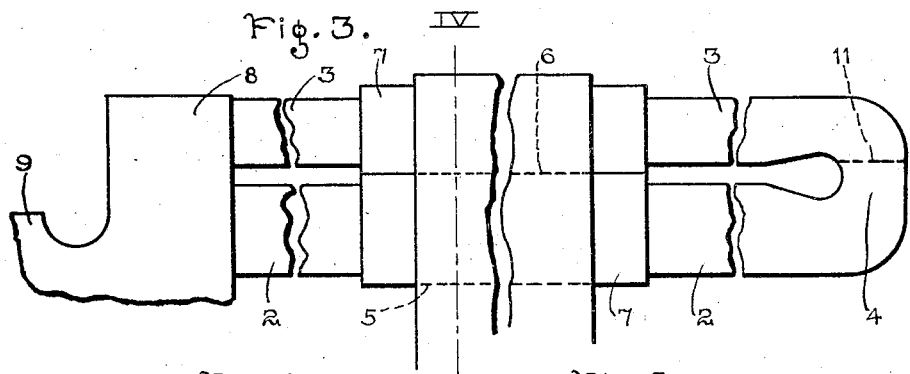
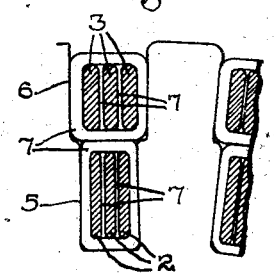 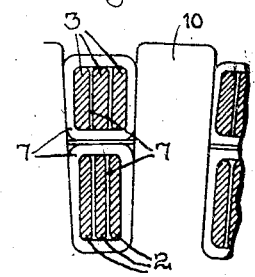
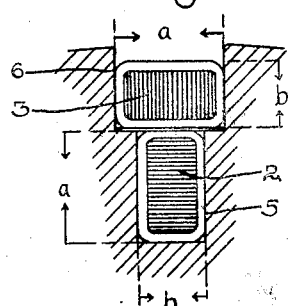 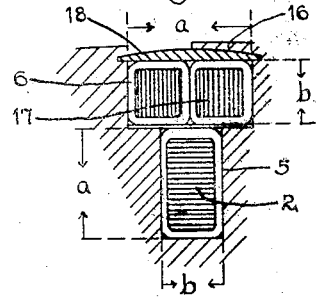
WITNESSES:
C.M.Cochran
INVENTOR
George H. Fletcher.
BY
ATTORNEY Patented Feb. 2, 1926.

1,571,914

UNITED STATES PATENT OFFICE.

GEORGE HERBERT FLETCHER, OF ASHTON-ON-MERSEY, ENGLAND, ASSIGNOR TO WESTINGHOUSE ELECTRIC AND MANUFACTURING COMPANY, A CORPORATION OF PENNSYLVANIA.

ARMATURE OF DYNAMO-ELECTRIC MACHINES.

Application filed September 2, 1922, Serial No. 585,846. Renewed January 7, 1926.

*To all whom it may concern:*

Be it known that I, GEORGE HERBERT FLETCHER, a subject of the King of Great Britain, and a resident of Ashton-on-Mersey, in the county of Chester, England, have invented new and useful Improvements Relating to Armatures of Dynamo-Electric Machines, of which the following is a specification.

This invention relates to armatures of dynamo-electric machines and in particular to the windings of armatures having toothed cores with the windings in slots between the teeth.

Except in the case of comparatively small machines the slots in armatures of the type above mentioned have usually been made with parallel sides although this causes the tooth to be wider at the tip than it is at the root and consequently the whole of the iron at the tip is not usefully employed. It has been proposed, therefore, to provide a stepped slot which is wider at the mouth of the slot than it is at the bottom in order that the space which was usually occupied by iron in the tip of the tooth should be usefully occupied by the copper of the winding. In such cases the conductors in the outer layer of the armature windings are made thicker than those in the inner layer so that the whole of the slot is filled with windings. As one side of a single turn of the winding is commonly placed in the outer part of a slot whereas the other side of the same turn occupies the lower part of another slot, it is clear that a single turn will include conductors of two different sections. These conductors are of course united at one end of the armature and this has been hitherto effected by providing a clip which is soldered or brazed and in some cases riveted to the respective ends of the conductors so as to form a turn of the winding. Each coil, therefore, included two joints in every turn which is expensive to manufacture. Where a number of conductors have to be located in each armature slot, the employment of clips in this manner is practically impossible as the joints take up more space than can be allowed at the ends of the armature.

One of the objects of my invention is to provide a device of the character described, in which the entire body of an armature tooth may be efficiently employed by forming the teeth with substantially uniform cross-sectional areas and the slots between the several teeth of varying cross-sectional areas, within which conductors of different sizes may be positioned.

Another object of my invention is to provide a device of the character described in which a single turn of a winding is formed of one piece of metal without the necessity for using clips by using a conductor the thickness of which is different on the two sides of the turn.

To enable the invention to be clearly understood it will now be described with reference to the accompanying drawings in which Fig. 1 is an elevation of a member constituting one turn of an armature winding in accordance with the invention, a portion of the sides thereof being broken away. Fig. 2 is a section through the sides of the member illustrated in Fig. 1, Fig. 3 shows diagrammatically the turn disposed upon an armature, part of which is broken away, and Fig. 4 is a section on the line IV—IV of Fig. 3 illustrating a tooth between stepped slots having parallel walls. Fig. 5 is a view similar to Fig. 4 illustrating a tapered slot and a tooth having substantially parallel sides and Fig. 6 illustrates the section of the turn employed with the slot and tooth illustrated in Fig. 5. Fig. 7 illustrates the section of a bar or strip from which the turn may be formed according to one method for a stepped slot such as illustrated in Fig. 4, and Fig. 8 is a similar view of the section which may be used when the slot is tapered as illustrated in Fig. 5. Fig. 9 illustrates a modified arrangement of the sides of a turn in a stepped slot and Fig. 10 illustrates a further modification in which the teeth are provided with lips overhanging the slots.

Referring first to Figs. 1 to 4 of the accompanying drawings, the member which is to constitute a single turn for use in stepped slots with substantially parallel walls such as shown for example in Fig. 4, comprises a side 2 of rectangular section whilst the other side 3 is also of rectangular section but the sectional dimensions are different. The height of the side 3 may be less and the thickness thereof is greater than the corresponding dimensions of the side 2; the sectional areas of the sides may be the same or substantially the same.

The member illustrated in Fig. 1 may be formed from a single strip of conductor having for example the section of the side 3 as illustrated in Fig. 2, approximately one half of such strip being re-rolled or re-drawn in such manner as to give to half of the entire strip the modified section such as that illustrated at 2 in Fig. 2. The strip thus constituted may be then bent as indicated diagrammatically at 4 in approximately the centre of its length so that the sides 2 and 3 thereof are parallel with one another and form a hair-pin loop. The two sides of the loop may then be separated from one another in a plane at right angles to that of the loop so as to form a coil of the desired span. In addition the bending or coiling will be such that the side 2 may be accommodated in the lower or inner part of a stepped slot whilst the associated side 3 may be accommodated in the outer part of another slot as will be well understood. Several such sides 2 and 3 may be accommodated in the inner and outer parts 5 and 6, respectively, of the slots as indicated for example in Fig. 4, suitable insulation being provided between and around the coil sides in the usual manner as indicated at 7. The several sides 2 or 3 in the lower or upper parts of the slots may be connected respectively with sides 3 and 2 in other slots in series or they may be connected in parallel to constitute composite conductors. The free ends of the coil sides 2 and 3 are connected to the necks 8 of the commutator segments 9 (shown with parts broken away in Fig. 3). It will be appreciated that as the commutator necks are naturally thicker at the outside where the diameter of the drum which they form is larger than at a smaller radius the stepped form of slot in said commutator necks is a convenient construction since the wider slot for the thicker coil side is situated in a thicker part of a commutator segment.

In case the armature slots are continuously tapered providing teeth 10 with substantially parallel sides as indicated in Fig. 5, the sections of the sides 2 and 3 of the turn or member 1 are correspondingly tapered as shown in Fig. 6 and may be formed by re-rolling or re-drawing a half length of a strip having for example the trapezoidal section shown at 3 in Fig. 6, such re-rolling or re-drawing producing the higher but thinner section of similar taper and nearly equal area as shown at 2 in Fig. 6. Turns having sides 2 and 3 thus constituted may be assembled in the tapered slots as shown in Fig. 5 in a manner which is similar to that described in connection with Fig. 4.

In some cases the turn or member 1 having limbs 2 and 3 of different sectional shape may be constituted by welding together two strips of substantially equal length at the place such as that indicated by way of example by the dotted line at 11 in Fig. 3, the ends to be united being bent and shaped in the required manner either before or after the welding operation which may be effected electrically or otherwise.

Alternatively, the turn or member 1 may be formed by suitably slotting a strip the cross-sectional shape of which is such as to include the respective sections required for the respective sides 2 and 3. Thus, as shown in Fig. 7, strips 12 having parallel sides 1 thicker at the upper part 13 than at the lower part 14 may be employed for example, the said parts merging into one another by a taper portion 15 which is subsequently removed. The length of the strip or bar will be a little more than half the mean length of the turn it is required to produce and the tapering portion 15 is removed parallel with the edges of the strip by punching, sawing or otherwise throughout nearly the whole length of the strip so that a substantially U-shaped member is provided similar to that illustrated in Fig. 1. The portion 4 which connects the two sides of such member may be rounded off and the two sides may be afterwards bent as previously described. When it is a case of tapered slots such as illustrated by Fig. 5 a strip having a section of corresponding taper such as illustrated in Fig. 8 may be employed, the middle portion of such strip being removed in the manner described in connection with Fig. 7. It may be pointed out that when tapered or wedge shaped conductors are employed the greatest thickness of the inner side 2 must be less than the smallest thickness of the outer side 3 in order to allow sufficient room for the necessary insulation between the inner and outer layers in the slot, such conditions being satisfied in the sections illustrated in Fig. 6. With tapered conductors also the arrangement is especially convenient as regards the connection thereof to the commutator necks 8 as previously herein pointed out. Since the slots in the commutator necks are tapered the walls of such slots may be of thicker and stronger cross section than in other cases.

A modified arrangement which may conveniently be adopted when the turns or coils comprise a multiplicity of rectangular, square or round wires grouped in such manner as to have a rectangular section one dimension of which is greater than the other, is illustrated in Fig. 9. The width $a$ of the outer part 6 of the stepped slot will be approximately equal to the height of the inner part 5 of the slot whilst the depth $b$ of the outer part 6 of the slot is equal to or greater than the width of the inner part 5 of the slot. The multiple conductor coil side is given a shape corresponding to the cross section of the inner part 5 of the slot and substantially in the middle of its length is given a twist of 90° and is then bent in the usual manner to bring the sides 2 and 3 thereof parallel with one another and to form a coil of the desired span, the side 2 being disposed in the inner part of a slot as shown in Fig. 9, whilst the associated side 3 of the turn fits in the outer part 6 of another slot. In other words the depth of the coil of the inner layer corresponds to the width of the coil in the outer layer. This method of carrying out the invention is applicable more especially to small motors. In some cases the opening of the slot at the periphery of the armature core may be narrower than the slot itself by reason of an overhung lip 16 provided for well known reasons connected with the design of the air gap. Such a slot is illustrated in Fig. 10 and with this form that part or side of a turn which is to be disposed in the outer part of the slot may be divided longitudinally into two portions 17 which may be inserted into the slot consecutively, the opening into the slot being at least half of the width $a$ of the outer part 6 of the slot. 18 is a slot wedge which may in some cases be used for retaining the conductors within the slots as will be well understood by those versed in the art.

It will be seen that a coil constructed in accordance with the present invention may be made to fit either stepped slots or slots with flat sides and which continuously taper in width from their mouths to their roots, one side of the coil being located in the mouth of a slot and the other side of a coil being located in the lower or root portion of the slot. By employing either a tapered or stepped shape of slot the iron and copper are used to the best advantage. A further advantage of using a uniformly tapered slot is that the insulated coils may be made to fit more tightly than would otherwise be possible and still be capable of being inserted in position without risk of injury to the coil or its insulation.

It will be understood that various modifications may be made in the shape and constitution of the turn without departing from the scope of the invention.

I claim as my invention:

1. An armature for a dynamo-electric machine comprising a core member provided with slots having a relatively wide portion and a relatively narrow portion, and a relatively flat continuous conductor having one of the slot-engaging portions thereof disposed on edge in the narrow portion of one of said slots and the other of said portions disposed transversely, with respect to the major dimension of the cross sectional area thereof, in the wide portion of another of said slots.

2. An armature for a dynamo-electric machine comprising a core member provided with slots having varying widths, a conductor disposed in said slots, the slot-engaging portions of said conductor being so twisted with respect to each other and to said slots that one of said portions engages the narrow portion of one of said slots and the other of said slot-engaging portions engages the wide portion of another slot.

In testimony whereof I have hereunto subscribed my name this 16th day of August 1922.

GEORGE HERBERT FLETCHER.